United States Patent
Gschwind et al.

(10) Patent No.: US 9,703,721 B2
(45) Date of Patent: *Jul. 11, 2017

(54) PROCESSING PAGE FAULT EXCEPTIONS IN SUPERVISORY SOFTWARE WHEN ACCESSING STRINGS AND SIMILAR DATA STRUCTURES USING NORMAL LOAD INSTRUCTIONS

(71) Applicant: International Business Machines Corporation, Armonk, NY (US)

(72) Inventors: Michael Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/583,974

(22) Filed: Dec. 29, 2014

(65) Prior Publication Data

US 2016/0188483 A1     Jun. 30, 2016

(51) Int. Cl.
  *G06F 12/10*    (2016.01)
  *G06F 12/1009*  (2016.01)
  *G06F 15/80*    (2006.01)

(52) U.S. Cl.
  CPC ...... *G06F 12/1009* (2013.01); *G06F 15/8007* (2013.01); *G06F 2212/65* (2013.01)

(58) Field of Classification Search
  CPC .............................. G06F 12/10; G06F 12/1009
  See application file for complete search history.

(56) References Cited

U.S. PATENT DOCUMENTS

| | | | |
|---|---|---|---|
| 5,043,867 A | 8/1991 | Bhandarkar et al. |
| 5,063,497 A | 11/1991 | Cutler et al. |

(Continued)

FOREIGN PATENT DOCUMENTS

| | | | |
|---|---|---|---|
| JP | 63197254 A | 8/1988 |
| JP | 2004327982 A | 11/2004 |

OTHER PUBLICATIONS

Appendix P, List of IBM Patents or Patent Applications Treated as Related dated Aug. 25, 2015.

(Continued)

*Primary Examiner* — David X Yi
*Assistant Examiner* — Zubair Ahmed
(74) *Attorney, Agent, or Firm* — Cantor Colburn LLP; William A. Kinnaman, Jr.

(57) ABSTRACT

Embodiments are directed to a method of accessing a data frame, wherein a first portion of the data frame is in a first memory block, and wherein a second portion of the data frame is in a second memory block. The method includes determining that an access of the data frame crosses a boundary between the first second memory blocks, determining that an attempted translation of an address of the first portion of the data frame in the first memory block did not result in a translation fault, and accessing the first portion of the data frame. The method further includes, based at least in part on a determination that an attempted translation of an address of the second portion of the data frame in the second memory block resulted in a translation fault, accessing at least one default character as a replacement for accessing the second portion of the data frame.

7 Claims, 9 Drawing Sheets

(56) References Cited

U.S. PATENT DOCUMENTS

| | | | |
|---|---|---|---|
| 6,205,533 B1* | 3/2001 | Margolus | G06F 15/8023 712/13 |
| 6,442,707 B1* | 8/2002 | McGrath | G06F 9/32 712/244 |
| 7,293,213 B1* | 11/2007 | Xiao | G06F 11/3688 714/741 |
| 7,610,469 B2 | 10/2009 | Ansari | |
| 8,862,932 B2 | 10/2014 | Gonion | |
| 9,298,592 B2 | 3/2016 | Sofia et al. | |
| 9,298,593 B2 | 3/2016 | Sofia et al. | |
| 9,383,939 B2 | 7/2016 | Dahlen et al. | |
| 9,383,941 B2 | 7/2016 | Dahlen et al. | |
| 2012/0124423 A1* | 5/2012 | Chakravadhanula | G01R 31/31727 714/27 |
| 2013/0111194 A1 | 5/2013 | Grochowski et al. | |
| 2013/0246738 A1 | 9/2013 | Bradbury et al. | |
| 2013/0246740 A1 | 9/2013 | Bradbury et al. | |
| 2013/0246751 A1 | 9/2013 | Bradbury et al. | |
| 2013/0246752 A1 | 9/2013 | Bradbury et al. | |
| 2013/0246757 A1 | 9/2013 | Bradbury et al. | |
| 2013/0246759 A1 | 9/2013 | Bradbury et al. | |
| 2013/0246762 A1 | 9/2013 | Bradbury et al. | |
| 2013/0246763 A1 | 9/2013 | Bradbury et al. | |
| 2013/0246764 A1 | 9/2013 | Bradbury et al. | |
| 2013/0246767 A1 | 9/2013 | Bradbury et al. | |
| 2014/0208086 A1 | 7/2014 | Bradbury et al. | |
| 2014/0237199 A1 | 8/2014 | Murray et al. | |
| 2015/0142819 A1* | 5/2015 | Florendo | G06F 17/30312 707/741 |
| 2016/0147533 A1 | 5/2016 | Bradbury et al. | |
| 2016/0202978 A1 | 7/2016 | Bradbury et al. | |
| 2016/0266903 A1 | 9/2016 | Bradbury et al. | |
| 2016/0266904 A1 | 9/2016 | Bradbury et al. | |

OTHER PUBLICATIONS

Michael Gschwind, "Processing Page Fault Exceptions in Supervisory Software When Accessing Strings and Similar Data Structures Using Normal Load Instructions." U.S. Appl. No. 14/829,896, filed Aug. 19, 2015.

Appendix P, List of IBM Patents or Patent Applications Treated as Related dated Dec. 30, 2014.

U.S. Appl. No. 14/562,132, filed Dec. 5, 2014, Entitled: Vector Exception Code, First Named Inventor: Jonathan D. Bradbury.

U.S. Appl. No. 14/583,970, filed Dec. 29, 2014, Entitled: Computer Instructions for Limiting Access Violation Reporting When Accessing Strings and Similar Data Structures, First Named Inventor: Michael Gschwind.

Appendix P, List of IBM Patents or Patent Applications Treated as Related dated Jun. 1, 2016. (2 pages).

Michael Gschwind, "Computer Instructions for Limiting Access Violation Reporting When Accessing Strings and Similar Data Structures" U.S. Appl. No. 14/821,940, filed Aug. 10, 2015.

List of IBM Patents or Patent Applications Treated as Related; Date Filed: Dec. 29, 2014, 2 pages.

* cited by examiner

PROCESSING PAGE FAULT EXCEPTIONS IN SUPERVISORY SOFTWARE WHEN ACCESSING STRINGS AND SIMILAR DATA STRUCTURES USING NORMAL LOAD INSTRUCTIONS

BACKGROUND

The present disclosure relates in general to receiving and processing page fault exceptions in supervisory software when accessing data structures. More specifically, the present disclosure relates to systems and methodologies that limit the protection violations that can occur when attempting to access strings that span across a memory boundary.

Null-terminated strings are often used in C and other programming languages. A null-terminated string is a contiguous sequence of characters (or elements, or bytes), wherein the last character in the string is a null character (typically a "0" value) that indicates the end of the string. Because an application does not know the actual size or location of a C-style null-terminated string, the application typically accesses, reads and loads null-terminated strings by sequentially accessing, reading and loading individual string characters until a null character is reached.

Memory may be organized into blocks. The address locations in a single block or page of memory typically share a common set of address translations and access permissions. Because the address locations in page memory are often some form of virtual memory address, address translations are needed in order to convert the virtual memory address to a physical or real memory address. Access permissions determine whether an application has privileges to read or write the contents of a memory page. A null-terminated string may be located at any arbitrary address within a memory page, including for example, near the end of a page, spanning a boundary that separates two different pages, or extending up to the end of a page without crossing the page boundary. An application attempting to access a null-terminated string that spans a page boundary must have access permissions for both pages. If the application has access to the first page but not the second page, a page fault violation occurs when the application attempts to perform an address translation for the second page. In order to protect system integrity, operating systems are typically strict in not allowing applications to access to a page without having the proper access permission. Thus, operating systems typically kill the offending application in response to a page access violation.

Single instruction multiple data (SIMD) processing is a performance enhancement feature that allows one instruction to operate on multiple data items at the same time. Thus, SIMD allows what usually requires a repeated succession of instructions (e.g., a loop) to be performed in one instruction. For a number of string data functions such as a comparison of two different strings or a string copy operation, SIMD has the potential to reduce processing time by processing multiple string characters in parallel. However, much of this reduced processing time is offset by the additional software overhead that is needed in order to avoid the above-described page translation violations that would occur if an application attempts a parallel data access and load (e.g., an SIMD load) of data that cross a memory page boundary, wherein the application does not have access privileges to the pages on both sides of the boundary.

SUMMARY

Embodiments are directed to a computer implemented method of accessing a data frame, wherein a first portion of the data frame is in a first memory block, and wherein a second portion of the data frame is in a second memory block. The method includes initiating, by a processor, an access of the data frame. The method further includes determining, by the processor, that the access of the data frame crosses a boundary between the first memory block and the second memory block. The method further includes determining, by the processor, that an attempted translation of an address of the first portion of the data frame in the first memory block did not result in a translation fault. The method further includes accessing, by the processor, the first portion of the data frame. The method further includes, based at least in part on a determination that an attempted translation of an address of the second portion of the data frame in the second memory block resulted in a translation fault, accessing at least one default character as a replacement for accessing the second portion of the data frame.

The above-described method may further include the data frame having a null-terminated string having an indeterminate length. The null-terminated string includes a data portion and at least one terminator character. The at least one terminator character indicates a termination of the null-terminated string.

The above described method may further include loading the first portion of the data frame into a target register. The method may further include, based at least in part on the determination that the attempted translation of the address of the second portion of the data frame in the second memory block resulted in the translation fault, loading the at least one default character into the target register as a replacement for loading the second portion of the data frame into the target register, wherein the at least one default character loaded in the target register represents a termination of a data portion of the data frame. The above-described loading of the first portion of the data frame, along with the above-described loading of the at least one default character, may include a serial operation or a parallel operation. The parallel operation may include a single instruction multiple data (SIMD) operation.

Embodiments are further directed to a computer implemented method of accessing a data frame, wherein a first portion of the data frame is in a first memory block, and wherein a second portion of the data frame is in a second memory block. The method includes initiating, by a processor, an access of the data frame. The method further includes determining, by the processor, that the access of the data frame crosses a boundary between the first memory block and the second memory block. The method further includes determining, by the processor, that an attempted translation of an address of the first portion of the data frame in the first memory resulted in a translation fault. The method further includes determining, by the processor, that a load instruction configured to be auto-terminating caused the translation fault.

The above-described method further includes, based at least in part on the determining, by the processor, that the load instruction configured to be auto-terminating caused the translation fault, accessing, by the processor, the first portion of the data frame, and accessing at least one default character as a replacement for accessing the second portion of the data frame.

The above-described method further includes, based at least in part on the determining, by the processor, that the load instruction configured to be auto-terminating caused the translation fault, loading the first portion of the data frame into a target register, and loading the at least one default character into the target register as a replacement for loading the second portion of the data frame into the target register. The at least one default character loaded in the target register represents a termination of a data portion of the data frame. The above-described loading of the first portion of the data frame, along with the loading of the at least one default character, includes a serial operation or a parallel operation. The parallel operation may include a single instruction multiple data (SIMD) operation.

Embodiments are further directed to a computer implemented method of accessing a data frame, wherein a first portion of the data frame is in a first memory block, and wherein a second portion of the data frame is in a second memory block. The method includes initiating, by a processor, an access of the data frame. The method further includes determining, by the processor, that the access of the data frame crosses a boundary between the first memory block and the second memory block. The method further includes determining, by the processor, that an attempted translation of an address of the first portion of the data frame in the first memory block did not result in a translation fault. The method further includes accessing, by the processor, the first portion of the data frame. The method further includes determining, by the processor, that an attempted translation of an address of the second portion of the data frame in the second memory block resulted in a translation fault. The method further includes determining, by the processor, that a load instruction configured to be auto-terminating caused the translation fault.

The above-described method further includes, based at least in part on the determining, by the processor, that the load instruction configured to be auto-terminating caused the translation fault, accessing at least one default character as a replacement for accessing the second portion of the data frame.

The above-described method further includes, based at least in part on the determining, by the processor, that the load instruction configured to be auto-terminating caused the translation fault, loading the first portion of the data frame into a target register, and loading the at least one default character into the target register as a replacement for loading the second portion of the data frame into the target register. The at least one default character loaded in the target register represents a termination of a data portion of the data frame. The above-described loading of the first portion of the data frame, along with the loading of the at least one default character, includes a serial operation or a parallel operation. The parallel operation may include a single instruction multiple data (SIMD) operation.

Embodiments are further directed to a computer system for accessing a data frame, wherein a first portion of the data frame is in a first memory block, and wherein a second portion of the data frame is in a second memory block. The system includes a processor configured to initiate an access of the data frame. The processor is further configured to determine that the access of the data frame crosses a boundary between the first memory block and the second memory block. The processor is further configured to determine that an attempted translation of an address of the first portion of the data frame in the first memory block did not result in a translation fault. The processor is further configured to access the first portion of the data frame. The processor is further configured to, based at least in part on a determination that an attempted translation of an address of the second portion of the data frame in the second memory block resulted in a translation fault, access at least one default character as a replacement for accessing the second portion of the data frame.

The above-described system further includes the processor further configured to load the first portion of the data frame into a target register. The processor is further configured to, based at least in part on the determination that the attempted translation of the address of the second portion of the data frame in the second memory block resulted in the translation fault, load the at least one default character into the target register as a replacement for loading the second portion of the data frame into the target register. The at least one default character loaded in the target register represents a termination of a data portion of the data frame. The above-described computer system includes further configuring the processor to load the first portion of the data frame and the at least one default character as a serial operation or a parallel operation. The parallel operation may be a single instruction multiple data (SIMD) operation.

Embodiments are further directed to a computer program product for accessing a data frame, wherein a first portion of the data frame is in a first memory block, and wherein a second portion of the data frame is in a second memory block. The computer program product includes a computer readable storage medium having program instructions embodied therewith, wherein the computer readable storage medium is not a transitory signal per se. The program instructions are readable by a processor circuit to cause the processor circuit to perform a method that includes initiating, by a processor, an access of the data frame. The method further includes determining, by the processor, that the access of the data frame crosses a boundary between the first memory block and the second memory block. The method further includes determining, by the processor, that an attempted translation of an address of the first portion of the data frame in the first memory block did not result in a translation fault. The method further includes accessing, by the processor, the first portion of the data frame. The method further includes, based at least in part on a determination that an attempted translation of an address of the second portion of the data frame in the second memory block resulted in a translation fault, accessing at least one default character as a replacement for accessing the second portion of the data frame.

The above-described computer program product method further includes loading the first portion of the data frame into a target register. The method further includes, based at least in part on the determination that the attempted translation of the address of the second portion of the data frame in the second memory block resulted in the translation fault, loading the at least one default character into the target register as a replacement for loading the second portion of the data frame into the target register. The at least one default character loaded in the target register represents a termination of a data portion of the data frame The above-described methods, computer systems and computer program products perform "safe" multi-byte storage access to exploit increased bandwidth that results from incorporating SIMD operations. Spurious exceptions are avoided in a number of situations, including the processing of strings when speculatively loading multiple characters at a time from the string, accessing characters that are beyond the string terminator, and accessing characters that span a page boundary. For storage accesses that do not span a page boundary, if the process has read permission, the data in storage is accessed and loaded to a target register. Further for storage accesses that do not span a page boundary, if the process does not have read permission, an exception is raised. For a storage access that spans a page boundary, if the process has read permission to the first page, data from the first page is loaded to a target register. If the process does not have read permission to the first page, an exception is raised and optionally the process is aborted. If the process has read permission to the second page, the data from the second page is loaded to a target register. If the process does not have read permission to the second page, default values are loaded to a target register as a replacement for loading actual data from the second page to the target register. For processing strings, setting the default values to zero has the added benefit of also terminating the string in the target register. For floating-point processes, the default value may be set to NaN. In computing, NaN standing for not a number and generally represents a numeric data type value representing an undefined value, especially in floating-point calculations. The disclosed systems and methodologies may be implemented completely in hardware, or in a combination of hardware and software.

Additional features and advantages are realized through techniques described herein. Other embodiments and aspects are described in detail herein. For a better understanding, refer to the description and to the drawings.

BRIEF DESCRIPTION OF THE SEVERAL
VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
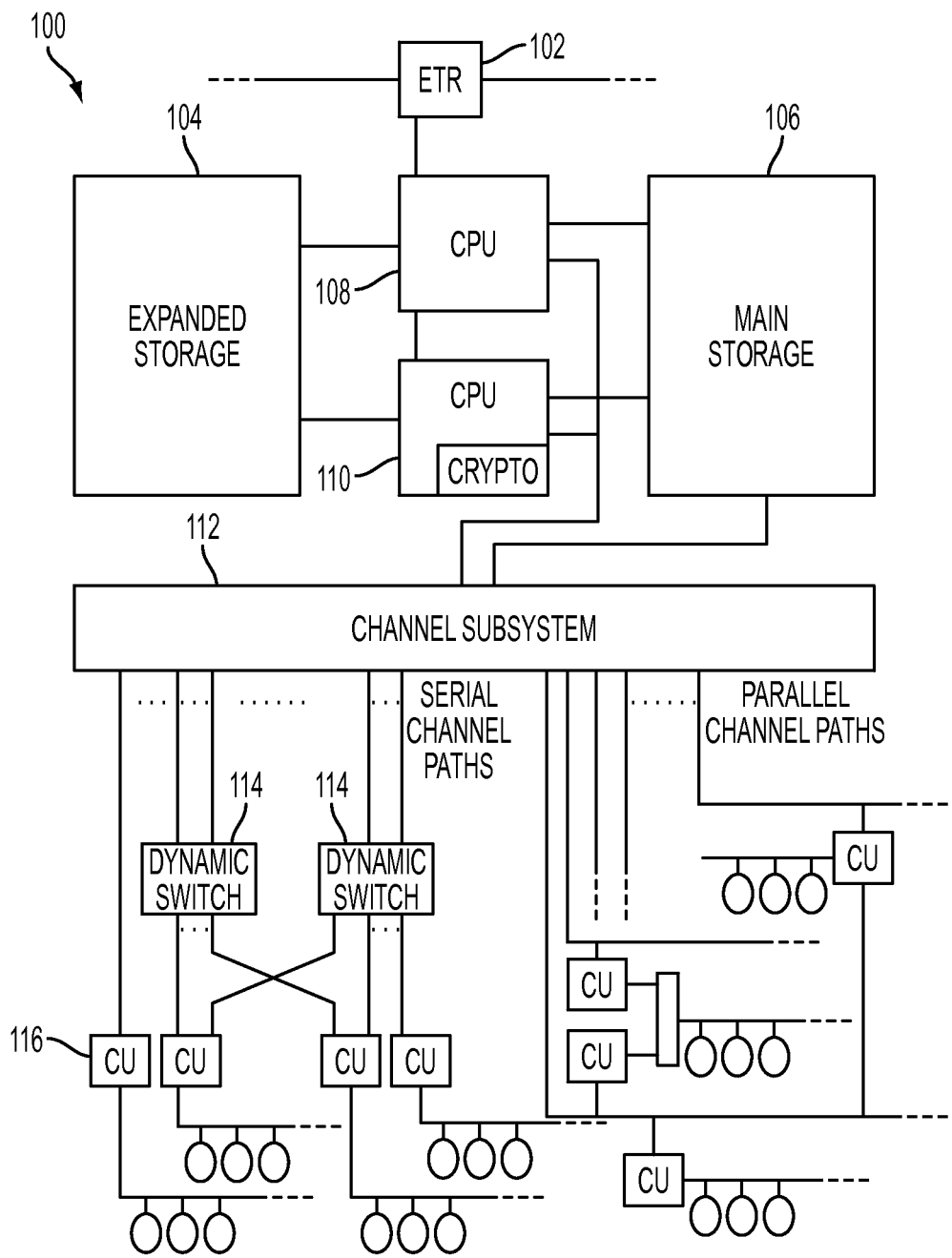
FIG. 1 depicts a logical structure of a z/Architecture system capable of implementing one or more embodiments of the present disclosure.

It is understood in advance that although this disclosure includes references to various computer programming languages (e.g., C, C++, C#, Java, etc.) and instruction set architectures (e.g., z Architecture, Power ISA, etc.), implementation of the teachings recited herein are not limited to any particular computing environment. Rather, embodiments of the present disclosure are capable of being implemented in conjunction with any other type of computing environment now known or later developed. Additionally, although embodiments of this disclosure are described in the context of read operations, the teachings recited herein apply equally to write operations.

The C programming language is a general purpose, procedural, imperative computer programming language developed in the early 1970s for the UNIX operating system. C is a complied language, which means that it must be run through a C compiler to turn the C program into an executable program that the computer can run. A C program, whatever its size, consists of functions, variables and data structures. A function contains statements that specify the computing operations to be done, and variables store values used during the computation. In the C programming language, a data type refers to an extensive system used for declaring variables or functions of different types. A variable's data type determines how much space it occupies in storage and how the bit pattern stored is interpreted. A data structure is a group of data elements grouped together under one name. These data elements, known as characters, can have different types and different lengths.

In the C programming languages, an often used data type is known as a string. In its most basic form, a string is a collection of any arbitrary number of characters (or elements, or bytes). A null-terminated string is a contiguous sequence of characters, wherein the last character is a null character (typically a "0" value) that indicates the end of the string. Null-terminated strings are typically accessed using pointers to the first character in the string. Generally, an application that is processing a C-style null-terminated string does not know the actual size and physical location of the string. Thus, the application keeps accessing and loading individual string characters until a terminator character is reached, thereby indicating the termination of the string.

The simplest type of data structure in computer architecture is a linear array, which consists of a collection of elements (or values, or variables) each identified by at least one array index. A programmer locates and accesses a particular array element by knowing an address and an index. The address identifies a start location of the particular array in memory, and the index identifies how far from the array start address the element is actually located. An array may include more than one dimension. A multi-dimensional array is organized in rows and columns, and is known generally as a matrix. A one-dimensional array is organized in a single row, and is known generally as a vector. A null-terminated string is typically a one-dimensional array of characters, wherein a pointer directs the application to a start location of the string. Unlike most other types of arrays, the length (size) of the string is not known. Accessing the string requires an incremental, sequential step through each character of the string/array until a terminator character is reached, thereby indicating the termination (or end) of the string, and from this process the length (size) of the string is determined.

The internal memory structure of contemporary computer architecture includes virtual and physical memory. Virtual memory is a method used by computers to extend their addressable range of memory. Thus, virtual memory is the memory a computer "appears" to have to a program running on the computer, whereas physical or real memory is the memory the computer actually has. Physical memory resides inside the computer and is the only memory directly accessible by the computer's central processing unit (CPU).

Program code must reside in physical memory in order to become executable, and program data must reside in physical memory in order to be read or modified.

Because not all of the program code and data need to reside in physical memory at the same time, the portions of the code and data that are not actually being used at the moment do not need to reside in physical memory and can be stored somewhere else until needed. In order to optimize the use of physical memory, a program and its data are broken up into virtual memory blocks called pages. The pages of code and data that are actually being used at the time reside in physical memory, while the rest of the program and data are stored on disk in a special place called the virtual memory page file. Virtual memory is implemented using both hardware and software to map or translate the memory addresses used by a program, called virtual addresses, into physical addresses in computer memory. The main storage as seen by a process or task appears as a contiguous address space or collection of contiguous segments. The operating system manages virtual address spaces and the assignment of physical memory to virtual memory. Address translation hardware in the CPU, often referred to as a memory management unit (MMU), automatically translates virtual addresses to physical addresses.

In the Power ISA operating environment, for example, the MMU translates logical (effective) addresses to physical addresses (referred to as real addresses in the architecture specification) for memory accesses, I/O accesses (most I/O accesses are assumed to be memory-mapped), and direct-store interface accesses. In addition, the Power ISA MMU provides various levels of access protection on a segment and page (or block) basis. Two general types of accesses generated in Power ISA require address translation, namely, instruction accesses and data accesses to memory generated by load and store instructions. Generally, the address translation mechanism is defined in terms of segment descriptors and page tables used by hardware to locate the effective to physical address mapping for instruction and data accesses. The segment information translates the effective address to an interim virtual address, and the page table information translates the virtual address to a physical address.

As a program continues to execute, it eventually comes to a place where it attempts to reference a part of the program or data that isn't in physical memory. When that happens, a page fault interrupt occurs, where program execution stops, and the operating system takes control to handle the interrupt. The page of code or data that is needed is copied from the virtual memory page file into physical memory, the page fault is cleared, and program execution resumes. Page faults are typically transparent to a user, but they can slow down program execution. There can be a variety of causes for a page fault interrupt, including causes that are associated with a read access violation. These additional causes of a page fault interrupt are discussed in more detail later in this disclosure.

Microprocessors may include "no-fault" functionality for processing load instructions. In general, during processing of a load instruction in connection with a "no-fault" operation, if the MMU detects an access violation, it may provide an access fault indication to the microprocessor. Typically a predetermined, default value, such as "zero," will be loaded into the register to be loaded, and the microprocessor will continue processing the program as if the access violation had not been detected. Such no-fault loads always return default data for the entire data to be loaded when any part of the data to be loaded is not accessible (e.g., a page out, no read/write permission, etc.). A load instruction processed in connection with "no-fault" functionality may be referred to as a "no-fault load instruction." Accordingly, conventional no-fault load instructions represent a relatively simple hardware view of whether the data to be accessed is available to hardware, and, when at least one portion of the data to be accessed is not available, return a default value for the entire datum, regardless of whether (1) either a portion of the datum is available, or (2) one or more portions of datum may be made available when paging in.

The address locations in a single block or page of memory share a common set of address translations and access permissions. Because the address locations are often some form of virtual memory address, address translations are needed in order to convert the virtual memory address to a physical or real memory address. Access permissions determine whether the current processor has the appropriate privileges to read or write the contents of a page. As previously noted herein, a string can be of any size and at any location within a memory page. For example, a string can be near the end of a page, it can span a page boundary, or it can extend to the end of the page and not cross the boundary. For conventional situations in which a string spans page boundaries, a program or application attempting to access such a string must have access permission to both pages. Having access permission to the first page but not the second page would cause a page fault violation and/or an access violation when the application attempts to access the portion of the string located in the second page. Computer languages are typically strict in not allowing access to a page without the proper access permission. Thus, operating systems typically kill the offending application in response to a page access violation.

As noted previously herein, SIMD is a performance enhancement feature that allows one microinstruction to operate on multiple data items at the same time. Thus, SIMD allows what would usually require a repeated succession of instructions (e.g., a loop) to be performed in one instruction. For a number of string data functions, such as a comparison of two different strings or a string copy operation, SIMD has the potential to reduce processing time by processing multiple string characters in parallel. However, much of this reduced processing time is offset by the additional software overhead that is needed in order to avoid the above-described page access violations that would occur if an application attempts a parallel data load (e.g., an SIMD load) of a string that crosses a memory page boundary, wherein the application does not have access privileges to the pages on both sides of the boundary.

Systems and methodologies for providing a new "auto-termination" load instruction methodology are disclosed in a co-pending, commonly assigned U.S. patent application entitled "COMPUTER INSTRUCTIONS FOR LIMITING ACCESS VIOLATION REPORTING WHEN ACCESSING STRINGS AND SIMILAR DATA STRUCTURES", invented by Michael K. Gschwind et. al., filed Dec. 29, 2014 and bearing application Ser. No. 14/583,970, the entire disclosure of which is incorporated herein by reference in its entirety. The "auto-termination" disclosure provides computer instructions, which may be implemented as a function call, that limit the access violation reporting that can occur when attempting to access a data that span across a memory boundary, wherein the application does not have access to the second page. In computer programming, a function is a self-contained software routine that performs a task, and functions are activated by placing a "function call" statement in the program. The auto-termination load instruction methodology disclosed in the above-referenced, co-pending U.S. patent application is referenced therein as "$MEM_{13}$ $AUTO_{13}$ TERM". The term $MEM_{13}$ $AUTO_{13}$ TERM is a shorthand notation for "perform a memory access that returns valid data automatically completed with terminator(s)." Instead of taking a page fault for the second page to which the application does not have access, the disclosed auto-termination load instruction methodology returns a default set of characters as a replacement for the portion of the access that lies in the page to which the application does not have access. Thus, if the application has read access to the first page but does not have read access to the second page, the disclosed auto-termination load instruction methodology would return the actual data from the first page of memory, but would return default values for the part of the access that resides in the second page to which the application does not have read access. If the data being accesses is a null-terminated string, the default value would be zeros, which would be interpreted as ending the string. Thus, the auto-termination load instruction methodology makes it appear that the null-terminated string actually ends at the page boundary, thereby avoiding having the operating system take an access violation and killing the application for attempting to access data on the second page to which the application does not have access. The string vector is "speculatively" loaded such that the application is allowed to continue, and the adverse side effects of killing the application are avoided. Thus, the functioning of a computer itself may be improved.

The auto-termination load instruction methodology of the co-pending, commonly assigned U.S. patent application is a modification of an existing computer instruction set that enables software to implement a modification of the previously described "no-fault" memory access when an access violation page fault is received upon the attempted execution of a load instruction, and a previously un-decoded field, either a control register field or an opcode field, indicates to the software that the memory access by this load instruction shall be treated as an "auto-termination" load memory access. In either case, the "auto-termination" memory access of the co-pending, commonly assigned U.S. patent application is embodied in a new, previously un-decoded field (mode controlled by a previously un-decoded control register field or by a previously un-decoded normal load instruction opcode field). By contrast, the systems and methodologies of the present disclosure provide additional software and hardware interventions for emulating the "perform a memory access that returns valid data automatically completed with terminator(s)" functionality. According to the systems and methodologies of the present disclosure, when a load that spans a page boundary returns a read violation in the second page, instead of the terminating the application the operating system emulates the new auto-termination load instruction by returning the actual data from the first page and returning default value(s) for the portion of the data that is on the page to which the application does not have access. The operating system then returns control to the application at the point after the load instruction and continues executing the application as if that access violation had not occurred.

One or more embodiments of the present disclosure provide systems and methodologies for receiving and processing page fault exceptions in supervisory software when accessing data structures. More specifically, one or more embodiments of the present disclosure relates to systems and methodologies that limit the protection violations that can occur when attempting to access strings that span across a memory boundary. In one or more embodiments of the present disclosure, spurious exceptions are avoided while accessing strings by receiving a page fault exception in supervisory software, and determining whether the fault address corresponds to a paged out address. If the page fault is for a paged out address, the corresponding page is paged in and the original instruction is restarted. If the page fault is not for a paged out address, the method determines if the cause of the page fault is a protection violation. If the page fault is not for a paged out address, and if the page fault was caused by a protection violation, a target register is loaded with data from an instruction-specified address up to a fault address, and any remaining bytes are initialized to a specified or default value. Control is then returned to the next instruction after the original instruction that caused the page fault. Thus, the functioning of a computer itself may be improved.

The present disclosure may be implemented in a system z/Architecture ISA (instruction set architecture) or a Power ISA™ or any other architecture that supports memory access protection. FIG. 1 depicts a logical structure of a z/Architecture system 100 capable of implementing one or more embodiments of the present disclosure. As shown, system 100 includes an external time reference (ETR) 102, an expanded storage 104, a main storage 106, a first central processing unit (CPU) 108, a second CPU 110, a channel subsystem 112, dynamic switches 114 and control units (CUs) 116 (for ease of illustration only one reference number for the CUs is shown), configured and arranged as shown. Specifically, expanded storage 104 and main storage 106 include array structures that are located and accessed according to an array index computation. Additional details of the overall operation of system 100 and a z/Architecture in general are disclosed in the following publications: *z/Architecture Principles of Operation*, Seventh Edition (February, 2008); and *z/Architecture Principles of Operation*, Tenth Edition (September 2012). Additional details of a Power ISA implementation of system 200 are disclosed in *Power ISA Version* 2.07 (May 10, 2013). Additional Power ISA documents are available via the World Wide Web at www-.power.org. The entire disclosure of each of the above-referenced publications is incorporated by reference herein in its entirety.

Details of the previously described new auto-termination load instruction methodology will now be provided. As noted herein, the new auto-termination load instruction methodology is the subject of a co-pending, commonly assigned U.S. patent application. The auto-termination load instruction methodology may be implemented as computer instructions, which may be implemented as a function call. In computer programming, a function is a self-contained software routine that performs a task. Functions can perform a large amount of processing or a small amount of processing such as adding two numbers and deriving a result. Values are passed to the function, and values may be returned. Alternatively, the function may just perform the operation and not return a resulting value. The benefit of incorporating a function within a program is that, once written, it can be used over and over again without the programmer having to duplicate the same lines of code in the program each time that same processing is desired. Programming languages provide a set of standard functions as well as allow programmers to define their own functions. For example, the C and C++ programming languages are built almost entirely of functions and always contain a "main" function. Functions in one program can also be called for by other programs and shared. For example, an operating system (OS) can contain more than a thousand functions to display data, print, read and write disks and perform myriad tasks. Programmers write their applications to interact with the OS using these functions. This list of functions is called the "application programming interface" (API). Functions are activated by placing a "function call" statement in the program. When called, the function performs the operation and returns control to the instruction following the call.

Figure 2A:
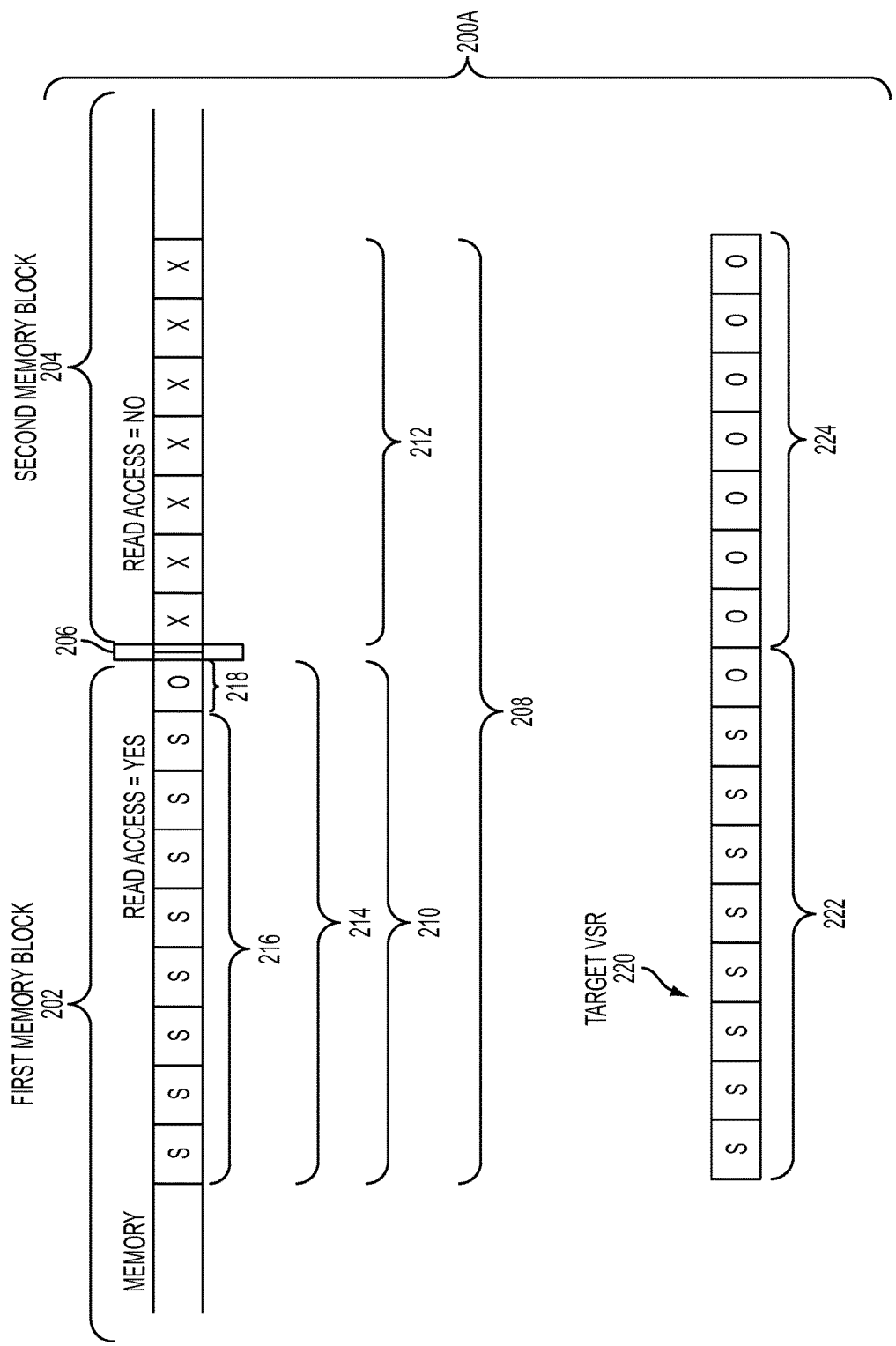
FIG. 2A depicts a diagram illustrating an example of an access and load operation according to an auto-termination load instruction methodology.
Figure 2B:
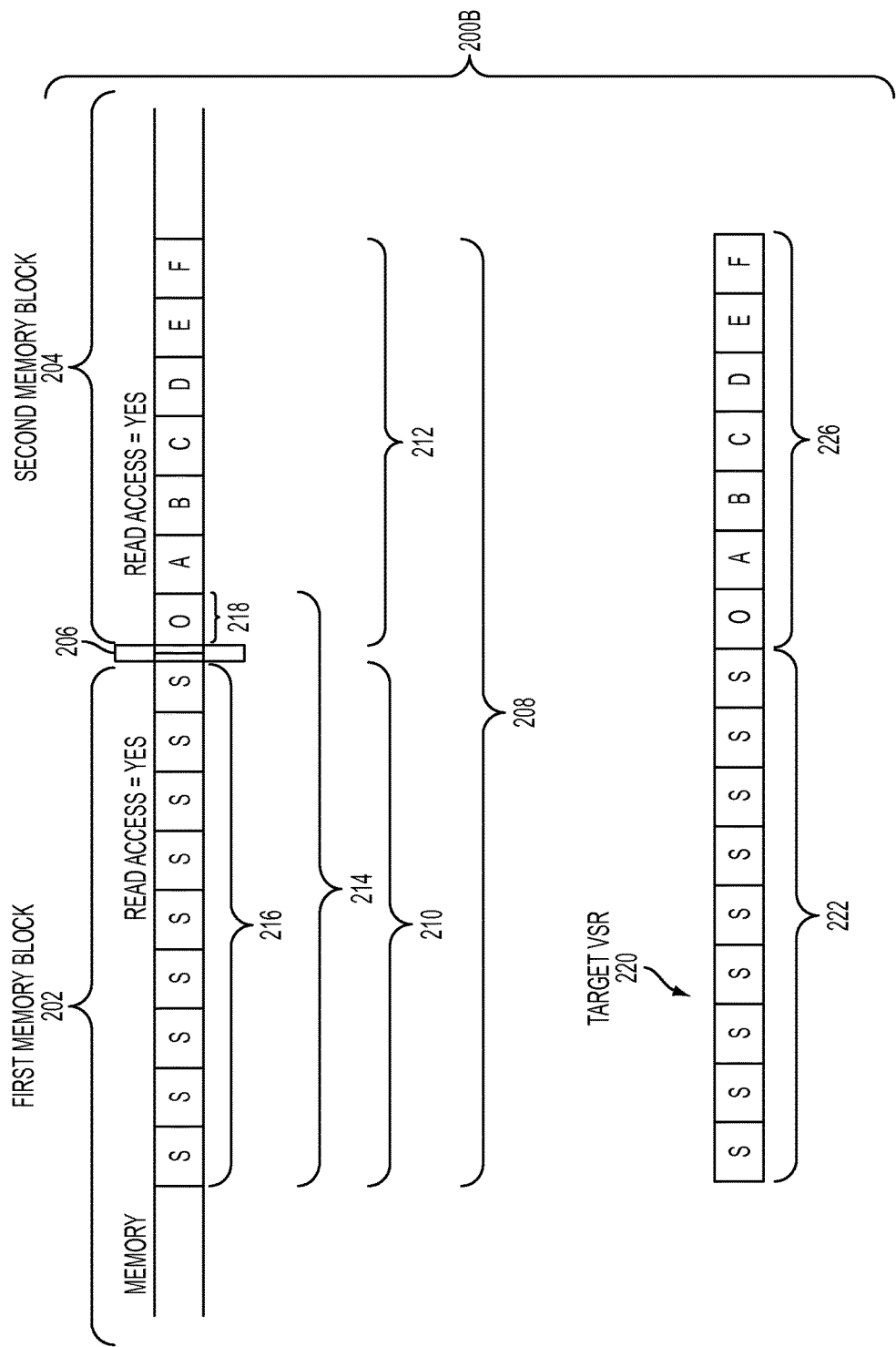
FIG. 2B depicts a diagram illustrating another example of an access and load operation according to an auto-termination load instruction methodology.
Figure 2C:
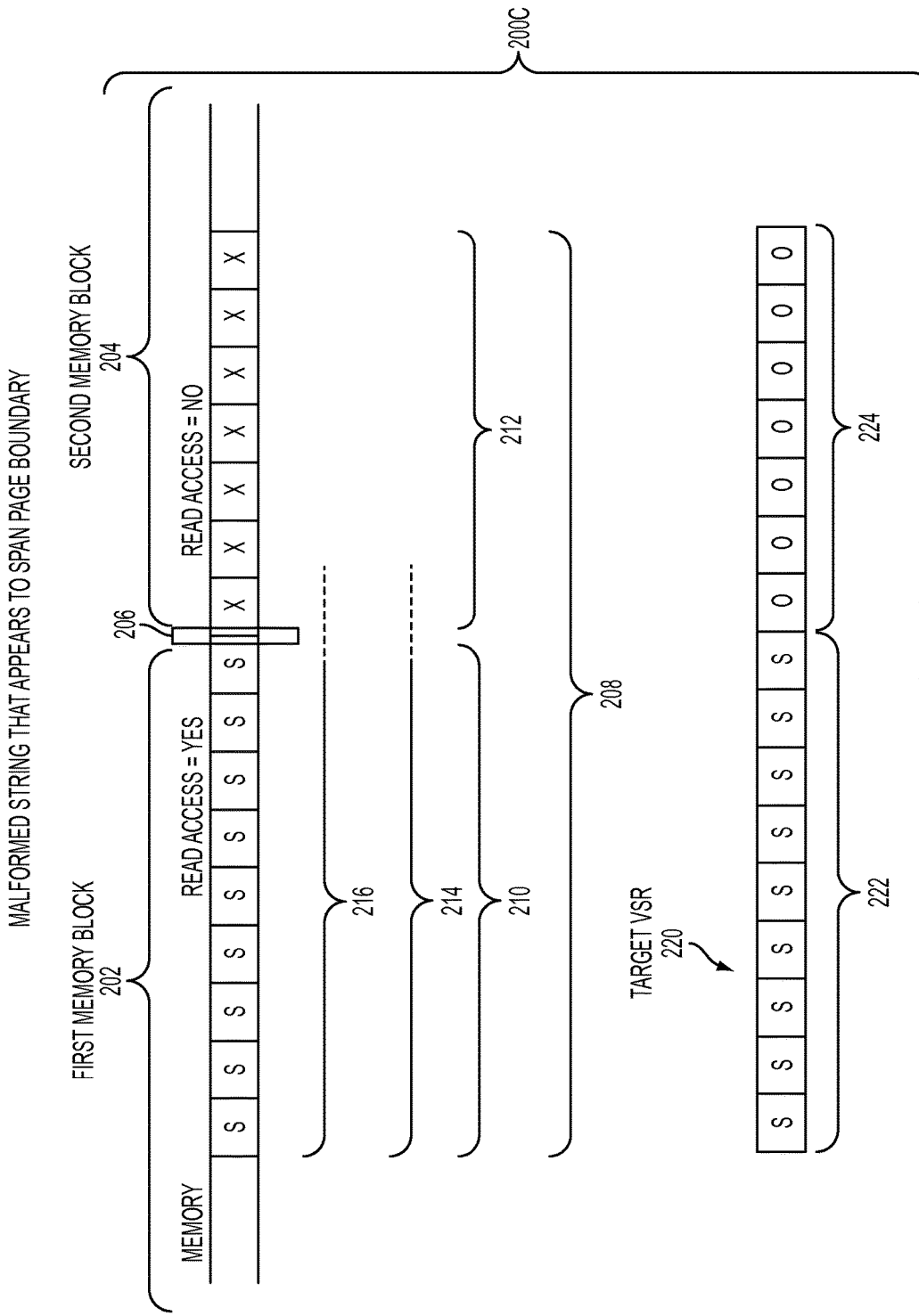
FIG. 2C depicts a diagram illustrating another example of an access and load operation according to an auto-termination load instruction methodology.

FIGS. 2A to 2C depict diagrams 200A, 200B, 200C that illustrate example operations of the auto-termination load instruction methodology according to one or more embodiments as set forth in the previously described co-pending, commonly assigned U.S. patent application. As shown in FIG. 2A, diagram 200A includes a first memory block 202, a second memory block 204, a memory block boundary 206, a data frame 208, a first portion 210 of data frame 208, a second portion 212 of data frame 208, a null-terminated string 214, a data portion of null-terminated string 216, a terminator character 218, a vector register 220, a loaded first portion 222 of data frame 208 and loaded default characters 224, configured and arranged as shown. Data frame 208 is 16 bytes long starting 9 bytes from the end of first memory block 202, spanning across memory block boundary 206 and extending 7 bytes into second memory block 204. Generally, data frame 208 corresponds to a vector length that can be accessed from a source in parallel and loaded to a target in parallel. For example, the Power ISA Architecture includes SIMD vector lengths (i.e., data frames) of 128 bits (or 16 bytes, or 16 characters), which provide the ability to load 16 characters at a time, in conjunction with an exemplary commonly employed 8 bit character size for many alphabet-based languages and codes (such as those encoded using the US ASCII standard, the ISO 8859 standard, but also codes such as the IBM EBCDIC code standard used by z/Architecture mainframes, the KOI8-R standard used for Russian Cyrillic, or VISCII, the Vietnamese Standard Code for Information Interchange). First portion 210 of data frame 208 is in first memory block 202, and second portion 212 of data frame 208 is in second memory block 204. Within data frame 208 is null-terminated string 214, which includes a data portion 216 and terminator character 218. For the example shown in diagram 200A, null-terminated string 214 is 9 bytes in length and located at the last 9 bytes of first memory block 202. As previously noted herein, a null-terminated string typically may have any size and location, and the application that needs to access and load the null-terminated string does not generally know the size of the null-terminated string. The application knows it has reached the end of a null-terminated string by detecting the terminator character provided at the end of the string. Within first and second memory blocks 202, 204, as well as vector register 220, the following notations are used. An "S" represents a string data character. An "X" represents a character located in a memory block to which the application does not have access permission. A "0" represents a terminator character that identifies a termination of the preceding string.

Continuing with the example shown in diagram 200A, the application has access permission to read and load data from first memory block 202 but does not have access permission to read and load data from second memory block 204. Using the auto-termination load instruction methodology, the application does not need to include additional code (e.g., additional overhead code 104 shown in FIG. 1 of the co-pending, commonly assigned application) that takes measures to prevent the page access violations that would occur in an application that attempts a SIMD load of a string that crosses a memory page boundary, wherein the application does not have access privileges to the pages on both sides of the boundary. As previously noted herein, the additional overhead code would in operation continuously check the distance from the current memory address to the end of the page. If the distance check determines that the current memory address is greater than 16 bytes in distance from the end of a page boundary, the application knows it can safely perform a vector load without crossing the page boundary. If the distance check determines that the current memory address is less than 16 bytes in distance from the end of a page boundary, the application knows it cannot safely perform a vector load without crossing the page boundary. The application must then invoke an alternative routine to avoid a page access violation, or simply accept the page access violation. As shown in FIG. 1 of the co-pending, commonly assigned application, additional overhead code 104 adds a significant amount of overhead to the overall processing cost, and the need to provide additional overhead code 104 offsets much of the reduced processing time that is gained from incorporating SIMD load operations into string processing. Using the auto-termination load instruction methodology avoids the need for additional overhead and allows the application to realize the decreased processing times that result from utilizing parallel SIMD vector load operations.

Continuing with the example shown in diagram 200A, the application has access permission to first memory block 202 and is in the process of accessing data frames from first memory block 202 then reading and loading the accessed data frames to target registers. A next access operation of the application is to access data frame 208 then read and load it to vector register 220. Data frame 208 begins at the end of first memory block 202, spans across memory block boundary 206 and extends into second memory block 204. The application has access permission for first memory block 202 but does not have access permission to second memory block 204. Because of the additional overhead costs, applications do not typically devote code to checking access permissions before every data access attempt. Thus, the application's attempt to access data frame 208 (more specifically, second portion 212 of data frame 208 from second memory block 202) causes a page fault and initiates a data storage interrupt (DSI).

In response to a DSI initiated by the disclosed auto-termination load instruction methodology, a new form of DSI is initiated. In general, a DSI occurs when a processor attempted to perform a storage access (load or store) and a problem was detected during the address translation process. In the Power ISA, for example, the causes of a DSI include, but are not limited to, the following: the data address translation is enabled and the virtual address of any byte of a specified storage location cannot be translated to a physical address; the specified effective address refers to storage that is "Write Through Required" or "Cache Inhibited" (caused only by some classes of storage access instructions); a "Data Access Breakpoint" match occurs; or the access violates storage protection. Except for the later cause, wherein the access violates storage protection, the former causes are handled by the operating system (or hypervisor) in the manner defined in their original function. In other words, the auto-termination load instruction methodologies do not modify how the former causes are processed. The later cause differs from the former causes in that a translation is actually found, however the application is not permitted to perform the storage access. The auto-termination load instruction methodologies modify how the later cause (i.e., the access violates storage protection) is handled under certain conditions as described in the following paragraph.

When a DSI occurs, an interrupt handler processes the DSI. In general, an interrupt handler is a section of a computer program or an operating system that takes control when an interrupt is received and performs the operations required to service the interrupt. To assist the interrupt handler, the specific cause of the DSI is indicated by hardware setting a particular status bit in an interrupt status register such as the data storage interrupt status register (DSISR) in the Power ISA. The computer hardware, according to the present disclosure, is configured to allow certain bits of the interrupt status register that assists the interrupt handler to only be set by specific instructions. For example, in the Power ISA, certain bits can be set only by specific instructions. The auto-termination load instruction methodologies add a new bit, referred to herein as an auto-termination violation status bit, to an interrupt status register, such as the DSISR for Power ISA, that is set if the DSI was caused by execution of the disclosed auto-termination load instruction. The auto-termination load instruction methodologies configure the interrupt handler to check the auto-termination violation status bit to determine whether to take special actions for this DSI without requiring examination and decoding of the offending instruction op code to make that determination. Thus, using the auto-termination systems and methodologies, the page access violation illustrated in FIG. 2A initiates an interrupt that sets a special bit in the DSISR to indicate the auto-termination load instruction methodology. For ease of reference, the special bit that is set in the DSISR in response to the page access violation illustrated in FIG. 2A shall be referred to as an auto-termination bit.

As applied to the example shown in diagram 200A of FIG. 2A, the disclosed auto-termination systems and methodologies proceed as follows. It is noted, however, that sequence or order of operations implied by the descriptions herein are provided for ease of explanation and illustration. It will be understood by persons skilled in the relevant art that, in application, the actual order in which stored characters are accessed, read, loaded, written or stored will vary depending on number of factors, including but not limited to, the actual application, the chosen computer architecture and whether the operations are performed in serial or in parallel. The application attempts to access first and second memory blocks 202, 204, read data frame 208 from memory, and load data frame 208 into vector register 220. Because data frame 208 spans first memory block 202 and second memory block 204, the attempt to access data frame 208 initiates a DSI and sets the auto-termination violation status bit in the DSISR. The interrupt handler, which is now configured to check the auto-termination violation status bit in response to a DSI, proceeds as follows when it determines that the auto-termination violation status bit is set. First portion 210 of data frame 208 is accessed and read from first memory block 202, then loaded into vector register 220. First portion 210 includes null-terminated string 214, which includes data portion 216 and terminator character 218. In place of accessing and reading second portion 212 of data frame 208, default characters 224 are accessed and read from a predetermined location, then loaded into vector register 220 as a replacement for accessing, reading and loading second portion 212 of data frame 208. Accordingly, based at least in part on the auto-termination bit being set in the DSISR, first portion 210 of data frame 208 is accessed from first memory block 202 and loaded as loaded first portion 222 into vector register 220, and default characters 224 are loaded into vector register 220 as a replacement for accessing and loading second portion 212 of data frame 208.

As applied to the example shown in diagram 200A of FIG. 2A, the disclosed auto-termination load instruction methodology allows an application to perform the access across memory block boundary 206 without taking a page access error. Because the complete null-terminated string 214 (data portion 216 and terminator character 218) is in a memory block to which the application has access (first memory block 202), the correct null-terminated string is loaded into vector register 220, and the application avoids taking a page access violation error, which would potentially kill the application. The disclosed auto-termination load instruction methodology facilitates the incorporation of SIMD vector load operations that reduce processing time by processing multiple string characters in parallel. The disclosed auto-termination load instruction methodologies allow the application to avoid the inclusion of additional code (e.g., additional overhead code 104 shown in FIG. 1 of the co-pending, commonly assigned auto-termination application) that takes measures to prevent the page access violations that would occur in an application that attempts an SIMD load of a string that crosses a memory page boundary, wherein the application does not have access privileges to the pages on both sides of the boundary. Thus, the reduced processing time from incorporating SIMD vector loading is not offset by the additional software overhead that is needed in order to avoid the above-described page access violations that would occur in an application that attempts a parallel data load of a string that crosses a memory page boundary, wherein the application does not have access privileges to the pages on both sides of the boundary.

Figure 6:
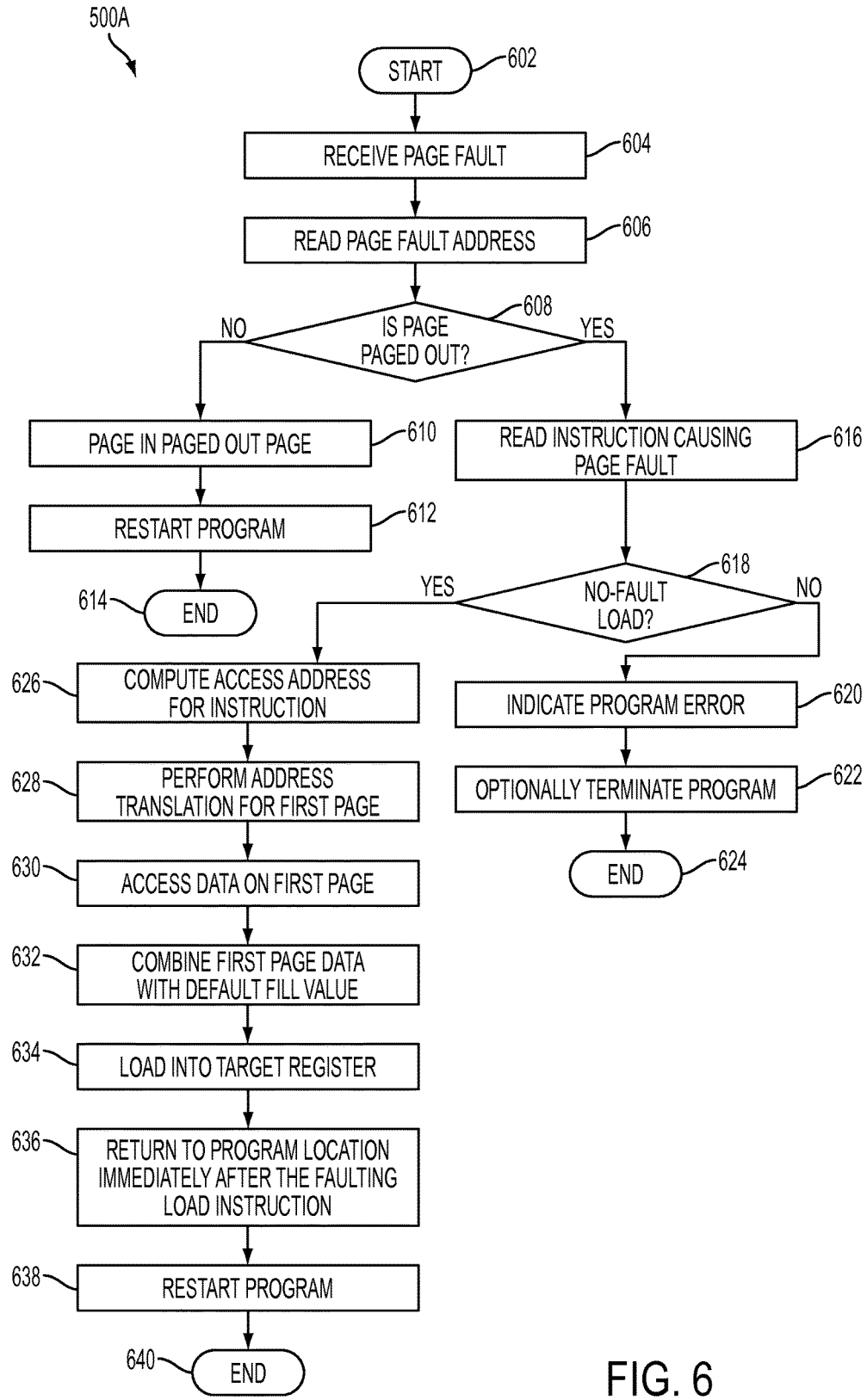
FIG. 6 depicts a flow diagram illustrating the software component of the methodology according to one or more embodiments.

Although diagram 200A is described in connection with parallel vector load operations, the teachings of the previously described, co-pending commonly assigned U.S. patent application also apply to serial load operations. In a serial load operation, each byte of data frame 208 and null-terminated string 214 would be loaded individually until terminator character 218 is reached, which indicates a termination of null-terminated string 214. The application would then attempt to access a next byte, which is in second memory block 202 to which the application does not have access permission. The application's attempt to read from second memory block 202 would initiate the same above-described interrupt that sets a special bit in the DSISR to indicate the auto-termination load instruction methodology, which may be implemented as a function call inside supervisory software to resolve and classify exception causes, page-in data, etcetera, as shown in FIG. 6, to achieve the overall instruction functionality shown in FIG. 4 (as will be described in greater detail later in this disclosure). As applied to the serial implementation of the example shown in diagram 200A of FIG. 2A, the auto-termination load instruction methodology proceeds as follows. In place of accessing and loading a first byte of second portion 212 of data frame 208 from second memory block 204 to vector register 220, at least one default character (e.g., at least one of default characters 224) is loaded into vector register 220 as a replacement for accessing and loading second portion 212 of data frame 208. Accordingly, based at least in part on the auto-termination violation status bit being set in the DISIR, first portion 210 of data frame 208 is accessed from first memory block 202 and loaded as loaded first portion 222 into vector register 220, and at least one default character is loaded into vector register 220 as a replacement for accessing and loading second portion 212 of data frame 208.

Turning now to FIG. 2B, diagram 200B illustrates an example of how null-terminated string 214 would be accessed and loaded when the application has access to first memory block 202 and second memory block 204. Similar to diagram 200A shown in FIG. 2A, diagram 200B includes first memory block 202, second memory block 204, memory block boundary 206, data frame 208, first portion 210 of data frame 208, second portion 212 of data frame 208, null-terminated string 214, data portion 216 of null-terminated string 214, terminator character 218, vector register 220 and loaded first portion 222 of data frame 208, configured and arranged as shown. Additionally, diagram 200B includes a loaded second portion 226 of data frame 208. Thus, diagram 200B is substantially the same as diagram 200A except for the following differences. First, the application in diagram 200B has access permission to second memory block 204. Second, null-terminated string 214 in diagram 200B is 10 bytes in length and located at the last 9 bytes of first memory block 202 and the first byte of second memory block 204. Third, within second memory block 204, as well as vector register 220, alphabet letters A, B, C, D, E and F are used to represent additional data characters that are part of data frame 208 but appear immediately after null-terminated string 214. Because the application in diagram 200B has access permission to read and load data from first and second memory blocks 202, 204, the auto-termination load instruction operation is not invoked, and the application performs its access and load operations normally. However, the presence of the auto-termination load instruction operation still provides benefits during normal access and load operations in that the application still does not need to include additional code (e.g., additional overhead code 104 shown in FIG. 1 of the co-pending, commonly assigned auto-termination load instruction methodology application) that takes measures to prevent the page access violations that would occur if an application attempts an SIMD load of a string that crosses a memory page boundary, wherein the application does not have access privileges to the pages on both sides of the boundary. Thus, even when the auto-termination load instruction operation is not invoked, the presence of the auto-termination load instruction operation still allows the application to avoid the need for additional overhead 104 (shown in FIG. 1 of the co-pending, commonly assigned auto-termination load instruction methodology application), and further allows the application to realize the decreased processing times that can result from utilizing parallel SIMD vector load operations.

Turning now to FIG. 2C, diagram 200C illustrates an example of how null-terminated string 214 would be accessed and loaded according to the disclosed auto-termination load instruction methodology when null-terminated string 214 does not terminate in first memory block 202 and the application has access permission to first memory block 202 but does not have access permission to second memory block 204. Similar to diagram 200A shown in FIG. 2A, diagram 200C includes first memory block 202, second memory block 204, memory block boundary 206, data frame 208, first portion 210 of data frame 208, second portion 212 of data frame 208, null-terminated string 214, data portion 216 of null-terminated string 214, vector register 220, loaded first portion 222 of data frame 208 and loaded default characters 224, configured and arranged as shown. All aspects of diagram 200C are the same as diagram 200A except that null-terminated string 214 and data portion 216 of null-terminated string 216 in diagram 200C are each at least 9 bytes in length, but the actual lengths are indeterminate because null-terminated string 214 and data portion 216 of null-terminated string 214 continue into second memory block 204 to which the application does not have access permission. Thus, the location of the terminator character of null-terminated string 214 is unknown.

Diagram 200C is an example of a malformed string, wherein the string spans a memory block boundary and extends into a memory block to which the application does not have access. This is a programming error that needs to be identified and corrected. However, for the example shown in diagram 200C, the attempt to access data frame 208 initiates a DSI and sets the auto-termination violation status bit in the DSISR. The interrupt handler, which under the present disclosure is now configured to check the auto-termination violation status bit in response to a DSI, proceeds as described above in connection with diagram 200A. First portion 210 of data frame 208 is accessed and read from first memory block 202, then loaded into vector register 220. First portion 210 includes data portion 216 of null-terminated string 214, which for the example shown in FIG. 2C does not include a terminator character. Accordingly, the length of data portion 216 of null-terminated string 214 is indeterminate. In place of accessing and loading second portion 212 of data frame 208 from second memory block 204 to vector register 220, default characters 224 are loaded into vector register 220 as a replacement for accessing and loading second portion 212 of data frame 208. Accordingly, based at least in part on the auto-termination violation status bit being set in the DSISR, first portion 210 of data frame 208 is accessed from first memory block 202 and loaded as loaded first portion 222 into vector register 220, and default characters 224 are loaded into vector register 220 as a replacement for accessing and loading second portion 212 of data frame 208. Loading the default characters has the effect of providing a terminating character in the loaded malformed string.

In order to identify the malformed null-terminated string shown in FIG. 2C, the auto-termination instruction methodologies of the present disclosure may further configure the interrupt handler to perform an additional check to identify whether it loaded a null-terminated string that is in fact a malformed string. For example, the interrupt handler may be further configured to perform a reload in a conventional manner (i.e., not the disclosed auto-termination instruction that would set the auto-termination violation status bit in DSISR) of the first default character to the target vector register at the same address. If the during the conventional reload of the first default character the application has read access to that address location, the application determines that the string was not a malformed string. If the during the conventional reload of the first default character the application does not have read access to that address location, the application determines that the string was malformed, takes the access violation exception and interrupt, and the operating system terminates the application.

Alternatives to the above-described methodologies for modifying an interrupt handling procedure to invoke the auto-termination instruction methodology in accordance with the present disclosure include providing a new register that captures the opcode of the offending instruction. This approach avoids the need to set up the storage access to load the opcode of the offending instruction into a GPR. However, the opcode would still need to be manually decoded to differentiate it from other storage access instructions. Additionally, a new DSISR bit could be provided that indicates an "auto-termination" load instruction caused the interrupt. This approach eliminates the overhead of loading and decoding the opcode of the offending instruction. However, it still requires the interrupt handler to sort through other possible causes of the data storage interrupt because some of the other possible causes may be considered higher priority and would therefore need to be ruled out before examining the bit for an "auto-termination" load. A new, dedicated "auto-termination" data storage interrupt that is triggered only by an "auto-termination" load would eliminate all overhead, permitting the interrupt handler to immediately proceed to implement the function without having to rule out other causes. Such an interrupt would still need to process paged-out operations, but would not have to sort through other special cases presented by other forms of storage access instructions.

Figure 3:
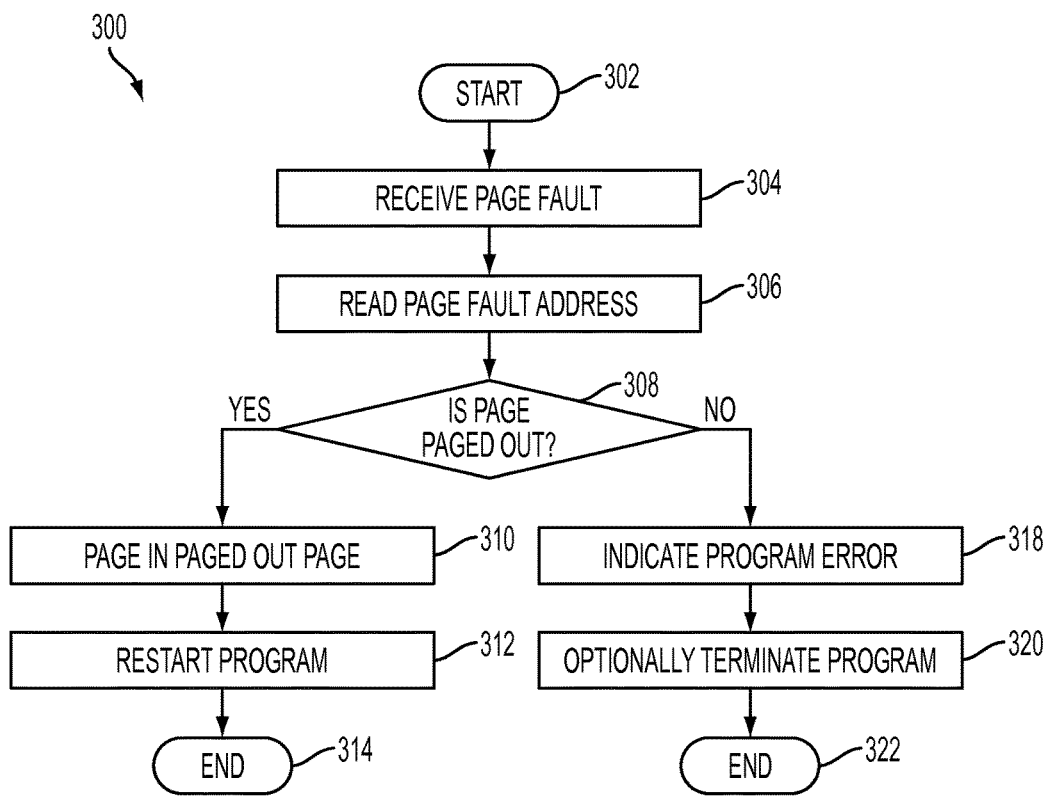
FIG. 3 depicts a flow diagram illustrating a known methodology for processing an interrupt that occurs during processing of a conventional load instruction, wherein the data to be loaded spans across a page boundary, and wherein the load instruction may or may not have access to the pages on both sides of the boundary.

FIG. 3 is a flow diagram illustrating a known methodology 300 for processing an interrupt that occurs during processing of a load instruction, wherein the data to be loaded spans across a page boundary, and wherein the load instruction may or may not have access to the pages on both sides of the boundary. Methodology 300 starts at block 302 and moves to block 304 where the operating system receives an interrupt indicating a page fault. Included with the interrupt will be the page fault address. Block 306 reads the page fault address. Decision block 308 determines whether or not the page fault interrupt was caused by the page fault address being "paged out." There can be a variety of causes for a page fault interrupt, many of which are not associated with a read access violation. For example, as a program continues to execute, it eventually comes to a place where it attempts to reference a part of the program or data that isn't in physical memory. When that happens, program execution stops, and the operating system issues a "page fault." The page of code or data that is needed is copied from the virtual memory page file into physical memory, the page fault is cleared, and program execution resumes. Page faults are typically transparent to a user, but they can slow down program execution.

In decision block 308, the operating system or the interrupt handler looks at the page and determines whether the page fault interrupt was caused by a normal page that has been paged out. If the answer to the inquiry at decision block 308 is yes, the operating system determines that the page has been paged out. Methodology 300 moves to block 310 to page in the paged out page, which essentially means to bring the page back off the disk, put it back into memory and remap it for the application. At blocks 312, 314 the operating system returns back to where it left off in the program and ends so the program can continue to execute. If the answer to the inquiry at decision block 308 is no, the operating system determines that the page is not paged out, and will typically indicate a program error at block 318. As noted above, there can be a variety of causes for the page fault interrupt, including that the program does not in fact have access to the page. In any event, at blocks 320, 322 the operating system optionally terminates the program and methodology 300 ends.

Figure 4:
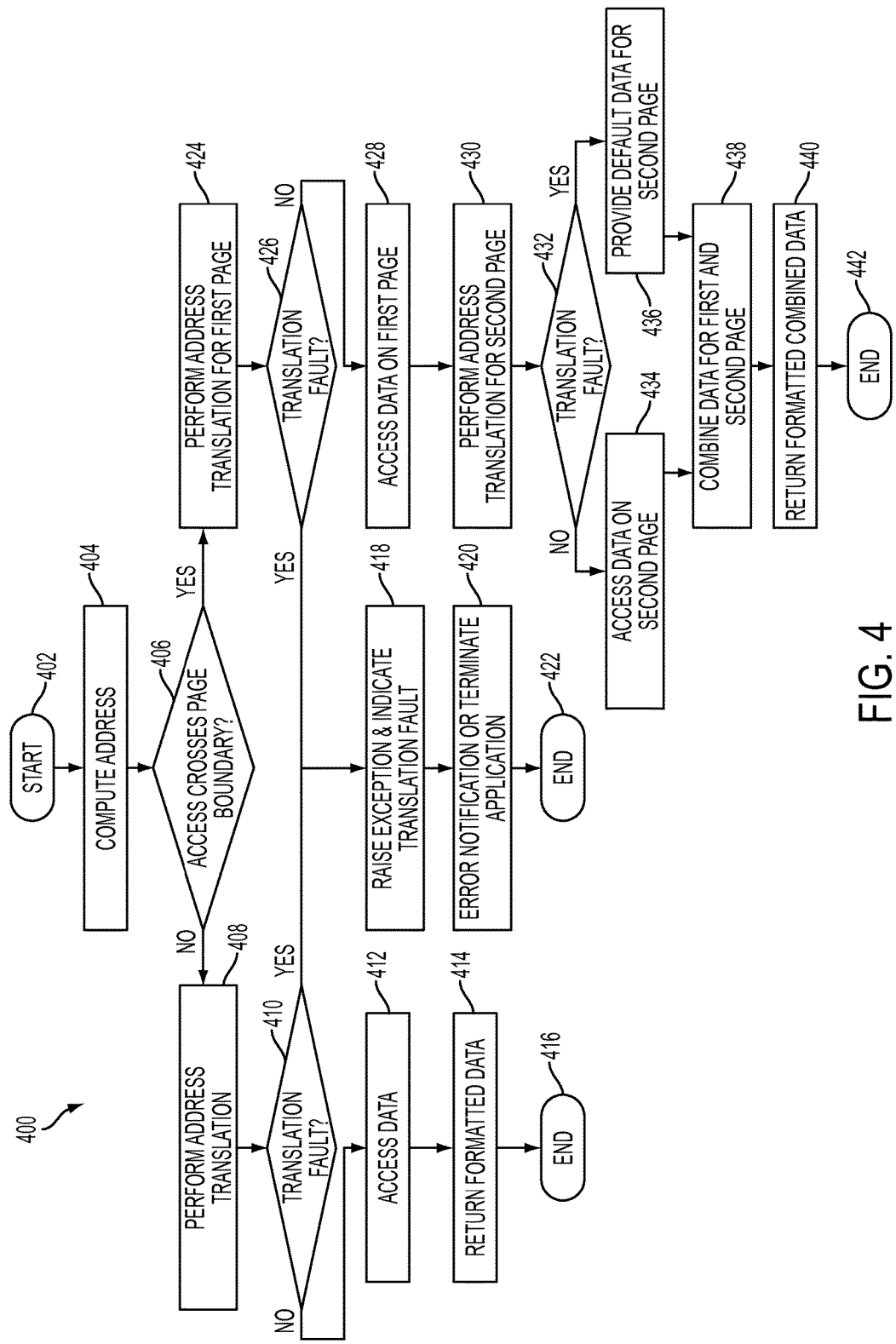
FIG. 4 depicts a flow diagram illustrating a system level methodology according to one or more embodiments.

FIG. 4 is a flow diagram illustrating a methodology 400 for processing an auto-termination load instruction methodology using a "normal" load instruction in accordance with one or more embodiments of the present disclosure, wherein the data to be loaded spans across a page boundary, and wherein the auto-termination load instruction methodology may or may not have access to the pages on both sides of the boundary. As used in the present disclosure, the term "normal load instruction" means that from a hardware operation standpoint the instruction looks like a "normal" load unless the "exceptional" behavior wherein one memory block is not accessible occurs, in which case the software interventions described herein are invoked. It is the software interventions that generate a distinguishable and separate opcode, so that software can determine whether to provide the new software function described herein (load bytes corresponding to the second memory block with a default value), or the traditional function (kill the application when any portion of an access is not permissible). Methodology 400 begins at block 402 then moves to block 404 to compute the initial address of the load. Decision block 406 determines whether or not the access to be attempted will cross a page boundary. If the answer to the inquiry at decision block 406 is no, the access will reside within one page, and methodology 400 proceeds to block 408 and performs an address translation. Decision block 410 determines whether there was a translation fault during performance of the address translation at block 408. If the answer to the inquiry at decision block 410 is no, the page is in memory, and methodology 400 accesses the data at block 412. Block 414 returns the formatted data to the vector register, and methodology 400 exits at block 416. If the answer to the inquiry at decision block 410 is yes, the page is not in memory, and methodology 400 takes an interrupt to the operating system, raises an exception and indicates a translation fault at block 418. Block 420 either delivers an error notification (e.g., a SIGBUS operation) or terminates the application. Methodology 400 exits at block 422.

If the answer to the inquiry at decision block 406 is yes, the access crosses a page boundary and resides within two pages. Methodology 400 proceeds to block 424 and performs an address translation for the first page. Decision block 426 determines whether there was a translation fault during performance of the address translation at block 424 for the first page. If the answer to the inquiry at decision block 426 is yes, the address translation for the first byte of the address failed. Methodology 400 takes an interrupt to the operating system, raises an exception and indicates a translation fault at block 418. Block 420 either delivers an error notification or terminates the application, and methodology 400 exits at block 422. If the answer to the inquiry at decision block 426 is no, the address translation did not fail, the first page is in memory, and methodology 400 accesses the data on the first page at block 428. Block 430 performs an address translation for the second page. Decision block 432 determines whether there was a translation fault during performance of the second page address translation at block 430. If the answer to the inquiry at decision block 432 is no, the address translation did not fail, the second page is in memory, and methodology 400 accesses the data on the second page at block 434. If the answer to the inquiry at decision block 432 is yes, block 436 determines whether the load instruction is to be treated as an "auto-termination" load instruction, and if so, instead of terminating the process, the interrupt handler provides default data as the replacement data for the second page. Blocks 434 and 436 lead to block 438, wherein the data for the first page and the second page are combined. Block 440 loads the formatted combined data to the vector register, and methodology 400 exits at block 442. Advantageously, in one or more embodiments, methodology 400 will commonly be executed directly hardware, except for blocks 420, 436 and optionally blocks 438 and 440, which may be preferably executed in software in accordance with one or more preferred embodiments of the present disclosure.

Figure 5:
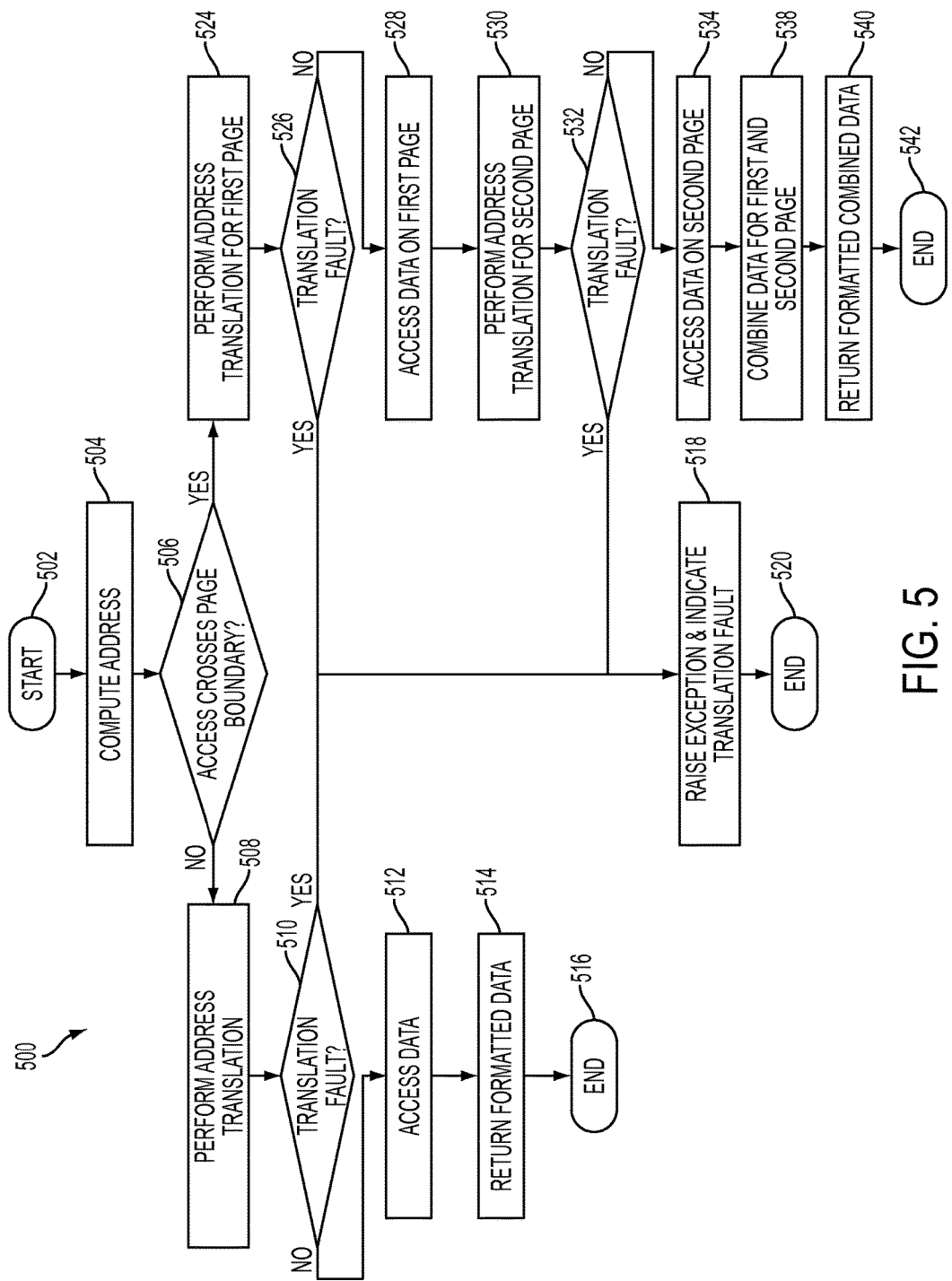
FIG. 5 depicts a flow diagram illustrating the hardware component of the methodology according to one or more embodiments.

FIGS. 5 and 6 are flow diagrams that illustrate methodologies 500, 500A for processing normal and auto-termination load instructions in accordance with one or more embodiments of the present disclosure, wherein the data to be loaded may or may not span across a page boundary, and wherein the load instruction may or may not have access to the pages on both sides of the boundary when the access does span a page boundary. More specifically, FIG. 5 and methodology 500 illustrate details of hardware-focused operations for processing normal and auto-termination load instructions, and FIG. 6 and methodology 500A illustrate details of software-focused operations for processing normal and auto-termination load instructions. Methodologies 500 and 500A work together to process normal and auto-termination load operations in accordance with one or more embodiments of the present disclosure.

As shown in FIG. 5, methodology 500 begins at block 502 then moves to block 504 to compute the initial address of the load. Decision block 506 determines whether or not the access to be attempted will cross a page boundary. If the answer to the inquiry at decision block 506 is no, the access will reside within one page, and methodology 500 proceeds to block 508 and performs an address translation. Decision block 510 determines whether there was a translation fault during performance of the address translation at block 508. If the answer to the inquiry at decision block 510 is no, the page is in memory, and methodology 500 accesses the data at block 512. Block 514 returns the formatted data to the vector register, and methodology 500 exits at block 516. If the answer to the inquiry at decision block 510 is yes, the page is not in memory, and methodology 500 takes an interrupt to the operating system, raises an exception and indicates a translation fault at block 518. Methodology 500 exits at block 520. As described in greater detail below, the exit at block 520 in an exit from the hardware-focused operations of methodology 500 to the software focused operations of methodology 500A (shown in FIG. 6).

If the answer to the inquiry at decision block 506 is yes, the access crosses a page boundary and resides within two pages. Methodology 500 proceeds to block 524 and performs an address translation for the first page. Decision block 526 determines whether there was a translation fault during performance of the address translation at block 524 for the first page. If the answer to the inquiry at decision block 526 is yes, the first page is not in memory, and methodology 500 takes an interrupt to the operating system, raises an exception and indicates a translation fault at block 518. Methodology 500 exits at block 520. As described in greater detail below, the exit at block 520 in an exit from the hardware-focused operations of methodology 500 to the software focused operations of methodology 500A (shown in FIG. 6). If the answer to the inquiry at decision block 526 is no, the first page is in memory, and methodology 500 accesses the data on the first page at block 528. Block 530 performs an address translation for the second page. Decision block 532 determines whether there was a translation fault during performance of the second page address translation at block 530. If the answer to the inquiry at decision block 532 is no, the second page is in memory, and methodology 500 accesses the data on the second page at block 534. Block 538 combines the data for the first page with the data for the second page. Block 540 returns the formatted combined data to the vector register, and methodology 500 exits at block 542. If the answer to the inquiry at decision block 532 is yes, methodology 500 takes an interrupt to the operating system, raises an exception and indicates a translation fault at block 518. Methodology 500 exits at block 520. As described in greater detail below, the exit at block 520 in an exit from the hardware-focused operations of methodology 500 to the software focused operations of methodology 500A (shown in FIG. 6).

Turning now to FIG. 6, methodology 500A illustrates details of a software-focused operation for processing normal and auto-termination load instructions in accordance with one or more embodiments. The exit from methodology 500 at block 520 (shown in FIG. 5) is, in effect, an exit from the hardware-focused operations of methodology 500 to the software focused operations of methodology 500A. As previously noted, methodologies 500 and 500A work together to process normal and auto-termination load operations in accordance with one or more embodiments of the present disclosure. Methodology 500A begins at block 602 and moves to block 604 where the operating system receives an interrupt indicating a page fault. Included with the interrupt will be the page fault address. Block 606 reads the page fault address. Decision block 608 determines whether or not the page fault interrupt was caused by the page fault address being "paged out." There can be a variety of causes for a page fault interrupt, many of which are not associated with a read access violation. For example, as a program continues to execute, it eventually comes to a place where it attempts to reference a part of the program or data that isn't in physical memory. When that happens, a page fault exception is detected, program execution stops, and an interrupt is taken to the operating system. The page of code or data that is needed is copied from the virtual memory page file into physical memory, the page fault is cleared, and program execution resumes at the location of the memory access instruction that caused the page fault. Page faults are typically transparent to a user, but they can slow down program execution.

In decision block 608, the operating system or the interrupt handler looks at the page and determines whether the page fault interrupt was caused by a page that has been paged out. If the answer to the inquiry at decision block 608 is yes, the operating system determines that the page has been paged out. Methodology 500A moves to block 610 to page in the paged out page, which essentially means to bring the page back off the disk, put it back into memory and remap it for the application. At blocks 612, 614 the operating system returns back to where it left off in the program and ends so the program can continue to execute. If the answer to the inquiry at decision block 608 is no, methodology 500A moves to block 616 to read the instruction causing the page fault. As noted above, there can be a variety of causes for the page fault interrupt, including that the program does not in fact have access permission to the page, and whether the memory access is a normal load instruction or an auto-termination load instruction. Decision block 618 determines whether the load instruction read at block 616 is a normal load instruction or an auto-termination load instruction by examining a previously un-decoded field, either a field in a control register or a field in the opcode of the load instruction. If the answer to the inquiry at decision block 618 is no, block 620 indicates a program error. At blocks 622, 624 the operating system optionally terminates the program and methodology 500A ends. If the answer to the inquiry at decision block 618 is yes, block 626 computes the access address for the auto-termination load instruction. At this stage, the operating system knows that the access crosses a page boundary, and that instruction causing the page fault is an auto-termination load instruction. Block 628 performs an address translation for the first page. Block 630 accesses the data on the first page. Block 632 combines data from the first page with default fill values. In accordance with the functionality of an auto-termination load instruction, the default fill values are a replacement for accessing and loading data from the second page. Block 634 loads the combined first page data and default fill value(s) into the target register in a manner that be specified by the application after returning to the application from the exception. Block 636 returns the application to the instruction that is just after the instruction that caused the interrupt. Methodology 500A exits at 640.

Thus, it can be seen from the forgoing detailed description and accompanying illustrations that technical benefits of the present disclosure include systems and methodologies to perform "safe" multi-byte storage access to exploit increased bandwidth that results from incorporating SIMD operations. Spurious exceptions are avoided in a number of situations, including the processing of strings when speculatively loading multiple characters at a time from the string, accessing characters that are beyond the string terminator, and accessing characters that span a page boundary. For storage accesses that do not span a page boundary, if the process has read permission, the data in storage is accessed and loaded to a target register. Further for storage accesses that do not span a page boundary, if the process does not have read permission, an exception is raised. For a storage access that spans a page boundary, if the process has read permission to the first page, data from the first page is loaded to a target register. If the process does not have read permission to the first page, an exception is raised and optionally the process is aborted. If the process has read permission to the second page, the data from the second page is loaded to a target register. If the process does not have read permission to the second page, default values are loaded to a target register as a replacement for loading actual data from the second page to the target register. For processing strings, setting the default values to zero has the added benefit of also terminating the string in the target register. For floating-point processes, the default value may be set to NaN. In computing, NaN standing for not a number and generally represents a numeric data type value representing an undefined value, especially in floating-point calculations. The disclosed systems and methodologies may be implemented completely in hardware, or in a combination of hardware and software.

Figure 7:
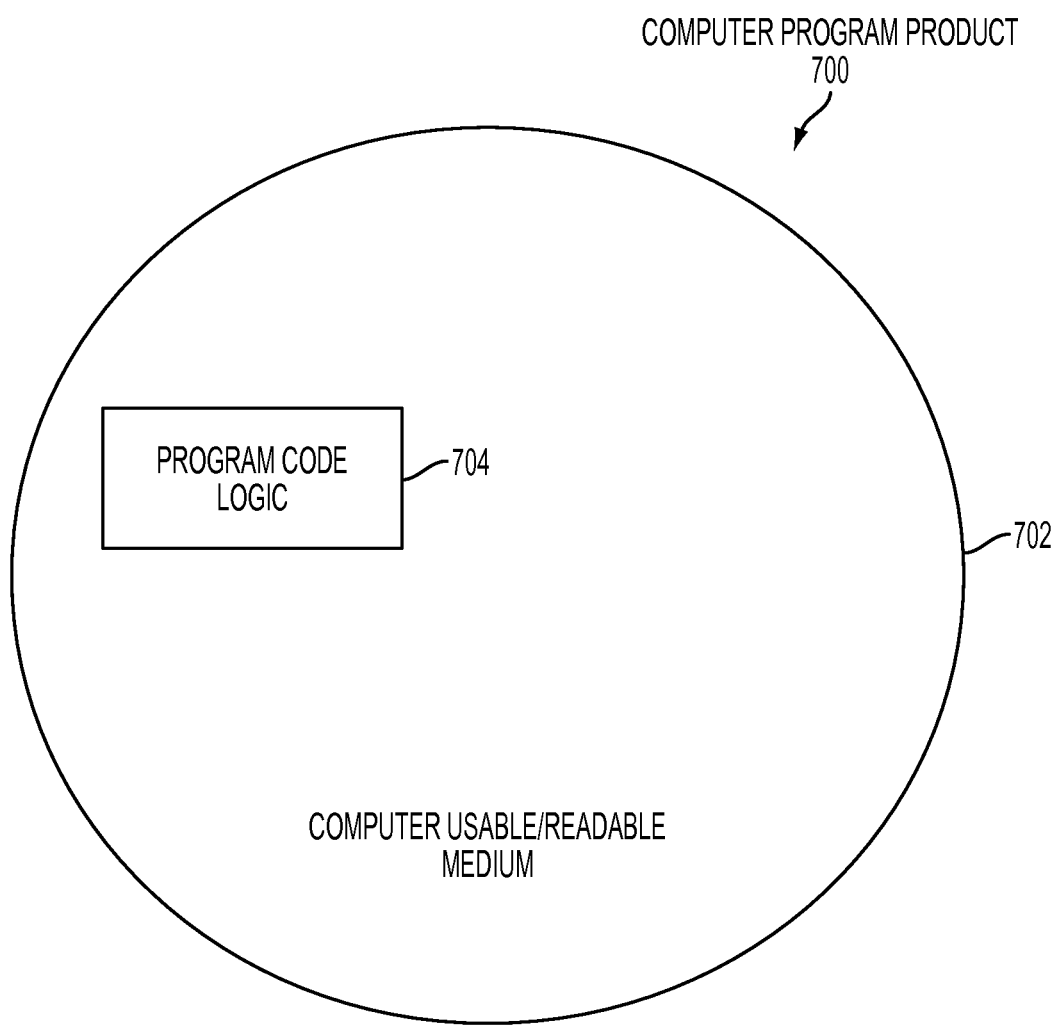
FIG. 7 depicts a computer program product according to one or more embodiments.

Referring now to FIG. 7, a computer program product 700 in accordance with an embodiment that includes a computer readable storage medium 702 and program instructions 704 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer system for accessing a data frame, wherein a first portion of the data frame is in a first memory block, and wherein a second portion of the data frame is in a second memory block, the system comprising:
   a processor configured to perform a sequence of operations that include operations to initiate an access of the data frame;
   said processor further configured to determine that said access of the data frame crosses a boundary between the first memory block and the second memory block;
   said processor further configured to determine that an attempted translation of an address of the first portion of the data frame in the first memory block did not result in a translation fault;
   said processor further configured to access the first portion of the data frame; and
   said processor further configured to, based at least in part on a determination that an attempted translation of an address of the second portion of the data frame in the second memory block resulted in a translation fault, interrupt said operations to initiate said access of the data frame in order to access at least one default character as a replacement for accessing the second portion of the data frame, and then return to the sequence of operations at a post-translation-fault operation that is among the sequence of operations and occurs after an operation that resulted in the translation fault.

2. The computer system of claim 1 further comprising:
   said processor further configured to load the first portion of the data frame into a target register; and
   said processor further configured to, based at least in part on said determination that said attempted translation of said address of the second portion of the data frame in the second memory block resulted in said translation fault, load said at least one default character into said target register as a replacement for loading the second portion of the data frame into said target register;
   wherein said at least one default character loaded in said target register represents a termination of a data portion of said data frame.

3. The computer system of claim 2, wherein said processor is further configured to load the first portion of the data frame and said at least one default character as a serial operation.

4. The computer system of claim 2, wherein said processor is further configured to load the first portion of the data frame and said at least one default character as a parallel operation.

5. The computer system of claim 4, wherein said parallel operation comprises a single instruction multiple data (SIMD) operation.

6. A computer program product for accessing a data frame, wherein a first portion of the data frame is in a first memory block, and wherein a second portion of the data frame is in a second memory block, the computer program product comprising:
   a computer readable storage medium having program instructions embodied therewith, wherein the computer readable storage medium is not a transitory signal per se, the program instructions readable by a processor circuit to cause the processor circuit to perform a method comprising:
   performing a sequence of operations that include operations that initiate an access of the data frame;
   determining that said access of the data frame crosses a boundary between the first memory block and the second memory block;

determining that an attempted translation of an address of the first portion of the data frame in the first memory block did not result in a translation fault;

accessing the first portion of the data frame; and based at least in part on a determination that an attempted translation of an address of the second portion of the data frame in the second memory block resulted in a translation fault, interrupting said operations that initiate said access of the data frame in order to access at least one default character as a replacement for accessing the second portion of the data frame, and then returning to the sequence of operations at a post-translation-fault operation that is among the sequence of operations and occurs after an operation that resulted in the translation fault.

7. The computer program product of claim 6 further comprising:

loading the first portion of the data frame into a target register; and based at least in part on said determination that said attempted translation of said address of the second portion of the data frame in the second memory block resulted in said translation fault, loading said at least one default character into said target register as a replacement for loading the second portion of the data frame into said target register;

wherein said at least one default character loaded in said target register represents a termination of a data portion of said data frame.

\* \* \* \* \*